(12) United States Patent
Neubert et al.

(10) Patent No.: US 8,057,740 B2
(45) Date of Patent: Nov. 15, 2011

(54) MEDICAL BIOSENSOR BY MEANS OF WHICH BIOLOGICAL LIQUIDS ARE ANALYZED

(75) Inventors: Ingo Neubert, Norderstedt (DE); Bernd Bunde, Apensen (DE)

(73) Assignee: tesa SE, Hamburg (DE)

( * ) Notice: Subject to any disclaimer, the term of this patent is extended or adjusted under 35 U.S.C. 154(b) by 560 days.

(21) Appl. No.: 11/569,896

(22) PCT Filed: May 23, 2005

(86) PCT No.: PCT/EP2005/052347
§ 371 (c)(1),
(2), (4) Date: Apr. 8, 2008

(87) PCT Pub. No.: WO2006/000505
PCT Pub. Date: Jan. 5, 2006

(65) Prior Publication Data
US 2008/0199893 A1    Aug. 21, 2008

(30) Foreign Application Priority Data
Jun. 23, 2004 (DE) .......................... 10 2004 030 387

(51) Int. Cl.
G01N 21/00 (2006.01)
G01N 31/00 (2006.01)
G01N 33/00 (2006.01)
G01N 27/00 (2006.01)
(52) U.S. Cl. ............ 422/81; 422/68.1; 436/43; 436/180
(58) Field of Classification Search .................... 422/81, 422/100, 102
See application file for complete search history.

(56) References Cited

U.S. PATENT DOCUMENTS

| | | | |
|---|---|---|---|
| 1,073,596 A | 9/1913 | Egerton | |
| 3,617,362 A * | 11/1971 | Bemmels et al. | 428/355 R |
| 4,581,429 A | 4/1986 | Solomon et al. | |
| 5,304,468 A | 4/1994 | Phillips et al. | |
| 5,385,846 A * | 1/1995 | Kuhn et al. | 205/777.5 |
| 5,759,364 A | 6/1998 | Charlton et al. | |
| 5,767,210 A | 6/1998 | Lecomte et al. | |
| 5,789,487 A | 8/1998 | Matyjaszewski et al. | |
| 5,811,500 A | 9/1998 | Dubois et al. | |
| 5,854,364 A | 12/1998 | Senninger et al. | |
| 5,916,156 A * | 6/1999 | Hildenbrand et al. | 205/778 |
| 5,945,491 A | 8/1999 | Matyjaszewski et al. | |
| 5,997,817 A | 12/1999 | Crismore et al. | |
| 6,114,482 A | 9/2000 | Senninger et al. | |

(Continued)

FOREIGN PATENT DOCUMENTS

DE    199 49 352    4/2000

(Continued)

OTHER PUBLICATIONS

Handbook of Pressure Sensitive Adhesive Technology, Donatas Satas (van Nostrand, New York 1989).

(Continued)

*Primary Examiner* — Brian J Sines
(74) *Attorney, Agent, or Firm* — Norris McLaughlin & Marcus PA (57) ABSTRACT

Medical biosensor by means of which biological liquids are analyzed, having at least three layers; a functional layer to which a contact adhesive strip, adhesive on both sided, is applied, and a structural film applied to the contact adhesive strip.

15 Claims, 5 Drawing Sheets

U.S. PATENT DOCUMENTS

| | | | |
|---|---|---|---|
| 6,255,448 B1 | 7/2001 | Grimaldi et al. | |
| 6,479,608 B1 | 11/2002 | Nesvadba et al. | |
| 6,555,061 B1 | 4/2003 | Leong et al. | |
| 6,562,210 B1 * | 5/2003 | Bhullar et al. | 204/403.03 |
| 6,627,057 B1 * | 9/2003 | Bhullar et al. | 204/403.01 |
| 6,729,352 B2 * | 5/2004 | O'Connor et al. | 137/827 |
| 6,830,668 B2 * | 12/2004 | Musho et al. | 204/400 |
| 7,063,775 B2 * | 6/2006 | Yamaoka | 204/403.06 |
| 7,175,897 B2 * | 2/2007 | Baron et al. | 428/36.91 |
| 7,452,457 B2 * | 11/2008 | Burke et al. | 205/792 |
| 7,549,323 B2 * | 6/2009 | Charlton et al. | 73/53.01 |
| 7,604,721 B2 * | 10/2009 | Groll et al. | 204/403.01 |
| 7,718,439 B2 * | 5/2010 | Groll | 436/149 |
| 7,727,467 B2 * | 6/2010 | Burke et al. | 422/58 |
| 7,749,437 B2 * | 7/2010 | Mosoiu et al. | 422/57 |
| 2002/0102739 A1 | 8/2002 | Nomura et al. | |
| 2002/0113009 A1 * | 8/2002 | O'Connor et al. | 210/511 |
| 2005/0208298 A1 | 9/2005 | Neubert et al. | |

FOREIGN PATENT DOCUMENTS

| | | |
|---|---|---|
| DE | 102 11 204 | 12/2003 |
| DE | 102 34 564 | 2/2004 |
| EP | 0 451 981 | 10/1991 |
| EP | 0 735 052 | 10/1996 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 1 225 448 | 7/2002 |
| EP | 1385002 | 1/2004 |
| EP | 1582575 | 10/2005 |
| WO | WO 93/03673 | 3/1993 |
| WO | WO 96/24620 | 8/1996 |
| WO | WO 98/01478 | 1/1998 |
| WO | WO 98/13392 | 2/1998 |
| WO | WO 98/44008 | 10/1998 |
| WO | WO 99/31144 | 6/1999 |
| WO | WO 01/67099 | 9/2001 |
| WO | WO 03/008091 | 1/2003 |
| WO | WO 03/008933 | 1/2003 |
| WO | WO 03/067252 | 8/2003 |

OTHER PUBLICATIONS

Houben Weyl, Methoden der Organischen Chemie, vol. E 19a, pp. 60 to 147.

Macromolecules 2000, 33, 243 to 245.

* cited by examiner

MEDICAL BIOSENSOR BY MEANS OF WHICH BIOLOGICAL LIQUIDS ARE ANALYZED

This is a 371 of PCT/EP2005/052347 filed 23 May 2005 (international filing date).

The present invention relates to a medical biosensor by means of which biological fluids are analyzed, also called a medical diagnostic strip.

BACKGROUND OF THE INVENTION

In modern medical diagnosis, strips referred to as diagnostic test strips are being used for an increasingly large number of analytical test strips. These diagnostic test strips can be used, for example, to determine the level of glucose, cholesterol, proteins, ketones, phenylalanine or enzymes in biological fluids such as blood, saliva and urine.

The most frequently encountered application of diagnostic test strips is the determination and monitoring of blood sugar level among diabetics. Roughly 175 million people worldwide suffer from diabetes mellitus type 1 and type 2. The trend in this condition is rising.

Many sufferers from this incurable disease monitor their blood sugar level up to 5 times a day in order to obtain the best match between the dosage of the medication (insulin) and the consumption of food, since an excessive blood sugar level inevitably makes health-related damage likely. Hitherto diabetics relied on the support of medical staff in order to determine the blood sugar level. To greatly simplify the monitoring of the blood sugar level a test was developed which enables the diabetic to determine his or her own blood sugar level with a minimum of effort and without reliance on medical staff.

To determine the blood sugar level the tester has to apply a drop of blood to a diagnostic test strip. During this procedure the diagnostic test strip is located in a read device or evaluation device. Following a reaction time or response time the evaluation device indicates the current blood sugar level. Read or evaluation devices of this kind are described for example in U.S. Pat. No. 5,304,468 A, EP 1 225 448 A1, and WO 03/08091 A1.

One of the first patents in the technical field of test strips appeared back in 1964. U.S. Pat. No. 1,073,596 A describes a diagnostic test and the test strips for analyzing biological body fluids, especially for determining blood sugar. The diagnostic test functions via the determination of a color change which is triggered by an enzyme reaction.

Determining a change in the concentration of a dye (colorimetric method) is still a method used today in the determination of blood sugar using diagnostic test strips. The enzyme glucose oxidase/peroxidase reacts with the blood sugar. The hydrogen peroxide formed then reacts with the indicator O-toluidines, for example—which leads to a color reaction. This color change can be monitored by colorimetric methods. The degree of change in color is directly proportional to the concentration of blood sugar. In this case the enzyme is located on a woven fabric. This method is described for example in EP 0 451 981 A1 and WO 93/03673 A1.

The modern development of diagnostic test strips aims to reduce the measurement time between the application of the blood to the test strip and the appearance of the result. The measurement time, or the time between the application of the blood to the diagnostic measurement strip and the display of the result, is dependent not only on the actual reaction time in the enzymic reaction and in the follow-on reactions but likewise, to a considerable extent, on the time taken for the blood to be transported within the diagnostic strip from the blood application site to the reaction site, in other words to the enzyme.

One of the ways in which the measuring time is reduced is by the use of hydrophilicized woven or nonwoven fabrics, as in U.S. Pat. No. 6,555,061 B, in order to transport the blood more quickly to the measuring area (enzyme). The measuring method is identical with that described in EP 0 451 981 A1. In the construction of the diagnostic strips a double-sided standard adhesive tape, Scotch® 415, is used. Surface-modified woven fabrics having a wicking effect for the biological fluid are described in WO 93/03673 A1, WO 03/067252 A1, and US 2002/0102739 A1. In the last citation, plasma treatment of the woven fabric produces a blood transport rate of 1.0 mm/s. With the use of woven fabrics for the transport of the biological test fluid such as blood, for example, a chromatography effect is observed, however; in other words, the individual constituents, such as cells, are separated from the liquid constituents. The chromatography effect is exploited explicitly in WO 03/008933 A2 for the purpose of separate analysis of the blood constituents.

An onward development from the colorimetric measurement technique is the electrical determination of the change in oxidation potential an electrode coated with the enzyme. This method and a corresponding diagnostic test strip are described in WO 01/67099 A1. The diagnostic strip is constructed by printing various functional coats, such as electrical conductors, enzyme, and hot-melt adhesive, onto the base material, which is of polyester, for example. Subsequently, an otherwise unspecified hydrophilic film is laminated on by thermal activation of the adhesive. The purpose of the hydrophilic film is to accelerate the transport of the blood to the measuring cell.

With this construction there is no need for woven or nonwoven fabric to transport the blood. The advantage of this construction and the advantage of the new measuring technique is that the blood sugar level can be measured with a very much smaller volume of blood, around 5 to 10 µl, and in a shorter measuring time.

U.S. Pat. No. 5,997,817 A describes an electrochemical biosensor in which the transport of the biological fluid is realized likewise by way of a hydrophilic coating. The coating in question is ARCARE 8586 (not available commercially) from Adhesive Research Inc. The transport of the biological fluid is evaluated in a specific capillary test of which no further details, however, are given.

DE 102 34 564 A1 describes a biosensor which is composed of a planar sensor or test strip and a compartmentalized reaction and measuring-chamber attachment produced by embossing a PVC film. The measuring-chamber attachment is composed of a very specific embossed design comprising sample application duct, measurement chamber, sample arrest duct, and sample collection space. The embossed depth of this compartmentalization amounts to 10 to 300 µm. The sample application duct and the measurement chamber are furnished with a woven hydrophilic fabric or with a surfactant coating for the transport of the biological fluid.

DE 102 11 204 A1 describes a flow-through measuring cell for the continuous determination of glucose. The measuring cell is composed of a planarly structured film which forms a small inlet duct and a substantially large outlet duct, the two ducts opening into one another by way of a defined angle.

U.S. Pat. No. 5,759,364 A describes an electrochemical sensor which is composed of a printed base plate and an embossed cover film of PET or polycarbonate. The concavely embossed cover film forms the measuring chamber and accommodates the enzyme for the detection reaction. For rapid blood transport the underside of the embossed cover film is coated with a hydrophilic polymer formed from a polyurethane ionomer.

In the majority of cases the diagnostic test strips described are produced by means of a discontinuous sequence of coating of laminating steps. The base material used is a 300 to 500 µm thick film of polyvinyl chloride, polyester or polycarbonate with dimensions of approximately 400×400 mm. For the functional capacity of the biosensors it is necessary to implement diecuts, some of them very complex, on the different materials or to process very complex diecut forms of, for example, pressure-sensitive adhesive (PSA) tapes. The result of this is a production operation which is complicated and slow in some cases. For some time now there have also been approaches at producing the diagnostic strips in continuous methods. The coating and laminating steps are commonly followed by a series of slitting operations. Owing to the small dimensions of the diagnostic strips, of approximately 20 mm×5 mm, the utmost precision is needed in the course of the coating, laminating, and slitting operations. Slitting to form the diagnostic strips is typically accomplished with very high cycle rates, using slitting machines obtained, for example, from Siebler GmbH or from Kinematik Inc.

In the course of the slitting operations it is possible for problems to arise to a considerable extent. When unsuitable materials, which exhibit inadequate adhesion to one another in the course of lamination, are used delamination in the slitting operation is observed continually. This inadequate adhesion may be attributed to an unsuitable adhesive, i.e., an adhesive having a very high shear strength, to an unsuitable bonding substrate, or to an unsuitable coating of the bonding substrate. Typical coatings with surface-active substances such as, for example, surfactants for the purpose of hydrophilicizing surfaces often lead to these delamination problems in the slitting operation. Relatively good strength of adhesion on the different bonding substrates is obtained if commercially customary pressure-sensitive adhesive tapes with low or moderate shear strength are used. In this case, however, instances of contamination of the slitting tool by residues of adhesive occur after just a short time. This contamination after just a few hours has already reached a level where the blades, drive units, and guide rails of the slitting machine must be changed over wholesale and cleaned. This gives rise to considerable maintenance and downtime costs.

The residues of adhesive mentioned are attributable to the commercially customary self-adhesive tapes employed. The use of non-self-adhesive hot-melt adhesives or heat-sealing adhesives such as those based, for example, on polyamides, polyisobutylene, polyvinylbutyral, polyesters, poly(ether sulfone)s, ethylene/ethyl acrylate copolymers or ethylene/vinyl acetate copolymers achieves a significant lengthening in the cleaning intervals.

When hot-melt adhesives are used, however, considerable disadvantages are observed in the construction of the diagnostic test strips. Activation of the hot-melt adhesives requires pressure and temperatures of at least 80° C. Under these conditions on the one hand there is a risk of thermal damage to the enzyme layer and to one of the woven or nonwoven fabrics used, and on the other hand it is impossible to realize a uniform and accurate distance between the functional layers such as base film, woven fabric and outer film of the diagnostic test strip. The distance between the functional layers determines the blood volume which is used for the measurement. If there are fluctuations in the blood volume as a result of an excessive range of fluctuation in the distance between the functional layers across—for example—different batches of test strips it is impossible to determine the blood sugar level reliably.

It is an object of the present invention to provide a medical biosensor by means of which biological fluids are analyzed, which in particular in the slitting operation during production leads to a considerable reduction in the residues of adhesive on the slitting tools, and which also ensures rapid transport of the biological fluid and hence a short measurement time.

SUMMARY OF THE INVENTION

The invention accordingly provides a medical biosensor by means of which biological fluids are analyzed, comprising at least three layers: a functional layer, atop which there is a double-sidedly pressure-sensitive adhesive tape, atop which there is a structured film. The shear strength of the adhesive at 25° C. and 70° C. under a weight load of 1000 g is greater than 10 000 min and the polymer or polymers of the adhesive have a K value of greater than 55 Pa*s.

The structure depth of the structured film is 20 to 150 µm and preferably 20 to 80 µm.

DETAILED DESCRIPTION

The pressure-sensitive adhesive tape (PSA tape) can be configured as a transfer PSA tape without carrier film or as a double-sided fixing adhesive tape composed of a carrier film coated on both sides with the PSA.

The adhesives on the top and bottom sides of the PSA tape may be identical or else may be selected so as to be different, in order to meet the respective requirements.

The sum of the adhesive coatweights on the top and on the bottom sides of the carrier material of the PSA tape is in a first advantageous embodiment not more than 40 g/m$^2$, preferably not more than 25 g/m$^2$, and with particular preference not more than 18 g/m$^2$.

With further preference the PSA tape is composed of a polyester carrier film coated on both sides advantageously with not more than 20 g/m$^2$, with further preference with not more than 12.5 g/m$^2$, of an adhesive.

The characteristic quality of the biosensor of the invention arises from the combination between the pressure-sensitive adhesive tape and the structured film, the intention being that the adhesive or PSA of the PSA tape ought to exhibit a high cohesion and shear strength, respectively.

The high shear strength of the PSA is manifested in a high polymer or copolymer K value of greater than 55 Pa*s, preferably greater than 60 Pa*s, and in a high shear strength of greater than 10 000 min at 70° C. under a weight load of 1000 g.

The high shear strength of the PSA is likewise reflected in the microshear travel investigation. This is a technique which allows the shear strength of PSAs to be investigated within a short measuring time. The microshear travel µS of the PSA tape after 15 minutes at 40° C. under a load of 500 g is preferably less than 100 µm, more preferably less than 60 µm, very preferably less than 30 µm, and most preferably less than 10 µm.

The ratio µS2/µS1, as a measure of the elasticity of the PSA of the PSA tape, is preferably less than 0.3 and more preferably less than 0.2.

Likewise advantageous is a polymer or copolymer dynamic glass transition temperature at 10 rad/s of −10° C. to 15° C. and preferably −6° C. to 4° C.

With further preference the bond strength of the adhesive to steel is at least 1.5 and preferably at least 2.5 N/cm and/or the bond strength to PET is at least 1.0 and preferably at least 2.0 N/cm.

Polymers suitable for preparing the adhesive of the PSA tape having the described properties include copolymers or copolymer mixtures of acrylate monomers or styrene block copolymers with, for example, ethylene, propylene, butylene, butadiene, hexene and/or hexadiene comonomers.

The PSA of the PSA tape is composed in the preferred embodiment of one or more copolymers of at least the following monomers c1) 79% to 100% by weight of acrylic esters and/or methacrylic esters and/or their free acids with the following formula $CH_2=CH(R_1)(COOR_2)$, where $R_1$=H and/or $CH_3$ and $R_2$=H and/or alkyl chains having 1 to 30 carbon atoms.

Here as well it is possible for the parent monomer mixture to be admixed with, as a further component, c2) up to 30% by weight of olefinically unsaturated monomers containing functional groups.

In one very preferred version the monomers used for c1) are acrylic monomers comprising acrylic and methacrylic esters with alkyl groups consisting of 4 to 14 carbon atoms, preferably 4 to 9 carbon atoms. Specific examples, without wishing to be restricted by this recitation, include n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and branched isomers thereof such as t-butyl acrylate and 2-ethylhexyl acrylate, for example.

Further classes of compound which may likewise be added in small amounts under c1) are methyl methacrylates, cyclohexyl methacrylates, isobornyl acrylate, and isobornyl methacrylates.

In one very preferred version the monomers used for c2) are vinyl esters, vinyl ethers, vinyl halides, vinylidene halides, vinyl compounds containing aromatic rings and heterocycles in α position.

Here again a number of examples may be given, without the recitation being regarded as being conclusive:

vinyl acetate, vinylformamide, vinylpyridine, ethyl vinyl ether, vinyl chloride, vinylidene chloride, and acrylonitrile.

In a further very preferred version monomers used for c2) include monomers containing the following functional groups:

hydroxyl, carboxyl, epoxy, acid amide, isocyanato or amino groups.

In one advantageous variant use is made for c2) of acrylic monomers corresponding to the general formula $CH_2=CH(R_1)(COOR_3)$, where $R_1$=H or $CH_3$ and the radical $R_3$ consists of or comprises a functional group which supports subsequent UV crosslinking of the PSA and which, for example, in one particularly preferred version, possesses an H-donor action.

Particularly preferred examples of component c2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(buthoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, and dimethylacrylic acid, this recitation not being conclusive.

In a further preferred version use is made for component c2) of aromatic vinyl compounds, where the aromatic nuclei are preferably $C_4$ to $C_{18}$ and may also include heteroatoms. Particularly preferred examples are styrene, 4-vinylpyridine, N-vinylphthalimide, methylstyrene, 3,4-dimethoxystyrene, and 4-vinylbenzoic acid, this recitation not being conclusive.

For the polymerization the monomers are in turn chosen such that the resulting polymers can be used as industrially useful PSAs, and especially such that the resulting polymers possess PSA properties as set out in the "Handbook of Pressure Sensitive Adhesive Technology" by Donatas Satas (van Nostrand, New York 1989).

In order to prepare the polyacrylate PSAs it is advantageous to carry out conventional radical polymerizations or controlled radical polymerizations. For the polymerizations proceeding by a radical mechanism it is preferred to use initiator systems which additionally comprise further radical initiators for the polymerization, especially thermally decomposing, radical-forming azo or peroxo initiators. In principle, however, any customary initiators that are familiar to the skilled person for acrylates are suitable. The production of C-centered radicals is described in Houben Weyl, Methoden der Organischen Chemie, Vol. E 19a, pages 60 to 147. These methods are preferentially employed analogously.

Examples of radical sources are peroxides, hydroperoxides, and azo compounds; some examples that may be mentioned of typical radical initiators include potassium peroxodisulfate, dibenzoyl peroxide, cumene hydroperoxide, cyclohexanone peroxide, di-t-butyl peroxide, azodiisobutyronitrile, cyclohexylsulphonyl acetyl peroxide, diisopropyl percarbonate, t-butyl peroctoate, and benzpinacol.

The average molecular weights $M_n$ of the PSAs formed in the course of the radical polymerization are very preferably chosen so as to be situated within a range from 20 000 to 2 000 000 g/mol; specifically for further use as hot-melt PSAs pressure-sensitive adhesives are prepared having average molecular weights $M_n$ of from 100 000 to 500 000 g/mol. The average molecular weight is determined by size exclusion chromatography (SEC) or matrix-assisted laser-desorption/ionization-mass spectrometry (MALDI-MS).

The polymerization can be carried out in bulk (without solvent), in the presence of one or more organic solvents, in the presence of water, or in mixtures of organic solvents and water. The aim is to minimize the amount of solvent used. Suitable organic solvents are simple alkanes (for example hexane, heptane, octane, isooctane), aromatic hydrocarbons (for example benzene, toluene, xylene), esters (for example ethyl, propyl, butyl or hexyl acetate), halogenated hydrocarbons (for example chlorobenzene), alkanols (for example methanol, ethanol, ethylene glycol, ethylene glycol monomethyl ether), and ethers (for example diethyl ether, dibutyl ether) or mixtures thereof.

A water-miscible or hydrophilic cosolvent may be added to the aqueous polymerization reactions in order to ensure that during monomer conversion the reaction mixture is in the form of a homogeneous phase. Cosolvents which can be used with advantage for the present invention are selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones and the like, and derivatives and mixtures thereof.

In an advantageous procedure, radical stabilization is carried out using nitroxides of the type (NIT 1) or (NIT 2):

where $R^{\#1}$, $R^{\#2}$, $R^{\#3}$, $R^{\#4}$, $R^{\#5}$, $R^{\#6}$, $R^{\#7}$ and $R^{\#8}$ denote independently of one another the following compounds or atoms:
i) halides, such as chlorine, bromine or iodine, for example;
ii) linear, branched, cyclic and heterocyclic hydrocarbons having 1 to 20 carbon atoms, which may be saturated, unsaturated or aromatic;
iii) esters —COOR$^{\#9}$, alkoxides —OR$^{\#10}$ and/or phosphonates —PO(OR$^{\#11}$)$_2$,
where $R^{\#9}$, $R^{\#10}$ and/or $R^{\#11}$ are radicals from group ii).

Compounds of the structure (NIT 1) or (NIT 2) may also be attached to polymer chains of any kind (primarily such that at least one of the abovementioned radicals constitutes a polymer chain of this kind) and may therefore be used to construct the block copolymers, as macroradicals or macroregulators.

A string of further polymerization methods by which the polyacrylate PSA may be prepared in an alternative procedure are known from the prior art and briefly described below.

U.S. Pat. No. 4,581,429 A discloses a controlled-growth radical polymerization process which uses as its initiator a compound of the formula R'R"N—O—Y, in which Y is a free radical species which is able to polymerize unsaturated monomers. The conversion rates of the reactions, however, are generally low. A particular problem is the polymerization of acrylates, which takes place only with very low yields and molar masses.

WO 98/13392 A1 describes open-chain alkoxyamine compounds which have a symmetrical substitution pattern.

EP 0 735 052 A1 discloses a process for preparing thermoplastic elastomers having narrow molar mass distributions.

WO 96/24620 A1 describes a polymerization process in which very specific radical compounds, such as phosphorus-containing nitroxides based on imidazolidine, for example, are used.

WO 98/44008 A1 discloses specific nitroxyls which are based on morpholines, piperazinones and piperazinediones.

DE 199 49 352 A1 describes heterocyclic alkoxyamines as regulators in controlled-growth radical polymerizations. Corresponding ongoing developments of the alkoxyamines or of the corresponding free nitroxides improve the efficiency for the preparation of polyacrylates (Hawker, paper given to the National Meeting of the American Chemical Society, spring 1997; Husemann, paper given to the IUPAC World Polymer Meeting 1998, Gold Coast).

As a further controlled polymerization method, Atom Transfer Radical Polymerization (ATRP) can be used advantageously to synthesize the block copolymers, in which case the initiator used preferably comprises monofunctional or difunctional secondary or tertiary halides and, for abstracting the halide(s), complexes of Cu, of Ni, of Fe, of Pd, of Pt, of Ru, of Os, of Rh, of Co, of Ir, of Ag or of Au (in accordance with EP 0 824 111 A1, EP 0 826 698 A1, EP 824 110 A1, EP 841 346 A1 or EP 850 957 A1). The various possibilities of ATRP are further described in U.S. Pat. No. 5,945,491 A, U.S. Pat. No. 5,854,364 A, and U.S. Pat. No. 5,789,487 A.

With further advantage the polymer utilized in accordance with the invention can be prepared by way of anionic polymerization. In this case the reaction medium used preferably comprises inert solvents such as, for example, aliphatic and cycloaliphatic hydrocarbons or else aromatic hydrocarbons.

In addition it is possible to use difunctional initiators such as, for example, 1,1,4,4-tetraphenyl-1,4-dilithiobutane or 1,1,4,4-tetraphenyl-1,4-dilithioisobutane. Coinitiators may likewise be employed. Suitable coinitiators include lithium halides, alkali metal alkoxides or alkylaluminum compounds. In one very preferred version the ligands and coinitiators are chosen such that acrylate monomers such as, for example, n-butyl acrylate, and 2-ethylhexyl acrylate can be polymerized directly and need not be generated in the polymer by a transesterification with the corresponding alcohol.

One very preferred preparation process conducted is a variant of the RAFT polymerization (reversible addition-fragmentation chain transfer polymerization). The polymerization process is shown in detail in, for example, WO 98/01478 A1 and WO 99/31144 A1. Suitable with particular advantage for the preparation are trithiocarbonates of the general structure R'''—S—C(S)—S—R''' (Macromolecules 2000, 33, 243 to 245).

In conjunction with the abovementioned controlled-growth radical polymerizations it is preferred to use initiator systems which additionally comprise further radical initiators for the polymerization, especially thermally decomposing, radical-forming azo or peroxo initiators. In principle, however, any customary initiators known for acrylates are suitable for this purpose. The production of C-centered radicals is described in Houben-Weyl, Methoden der Organischen Chemie, Vol. E19a, p. 60ff. These methods are employed preferentially.

Examples of radical sources are peroxides, hydroperoxides, and azo compounds. A number of non-exclusive examples of typical radical initiators that may be mentioned here includes potassium peroxo-disulfate, dibenzoyl peroxide, cumene hydroperoxide, cyclohexanone peroxide, cyclohexylsulphonyl acetyl peroxide, di-tert-butyl peroxide, azodiiso-butyronitrile, diisopropyl percarbonate, tert-butyl peroctoate, and benzpinacol. In one very preferred variant the radical initiator used is 1,1'-azobis(cyclohexylnitrile) (Vazo 88®, DuPont®) or 2,2-azobis(2-methylbutanenitrile) (Vazo 67®, DuPont®). In addition it is also possible to use radical sources which release radicals only under UV irradiation.

In the conventional RAFT process, polymerization is generally carried out only to low conversions (WO 98/01478 A1), in order to produce very narrow molecular weight distributions. As a result of the low conversions, however, these polymers cannot be used as PSAs and in particular not as hot-melt PSAs, since the high fraction of residual monomers adversely affects the technical adhesive properties, the residual monomers contaminate the solvent recyclate in the concentration process, and the corresponding self-adhesive tapes would exhibit a very high level of outgassing.

The internal strength (cohesion) of the polyacrylic PSA of the PSA tape is preferably increased by crosslinking. Crosslinking of the PSA increases the gel value and the microshear travel of the PSA tape. However there is also a reduction in the bond strength as a result of the crosslinking. For the crosslinking it is possible optionally to add compatible crosslinker substances to the acrylate PSAs. Particularly suitable crosslinkers include metal chelates, polyfunctional isocyanates, polyfunctional amines or polyfunctional alcohols. Crosslinking may advantageously take place thermally or by means of high-energy radiation (actinic radiation), in the latter case in particular by electron beams (EB) or, following the addition of suitable photoinitiators, by ultraviolet radiation. Preferred radiation-crosslinking substances are, for example, difunctional or polyfunctional acrylates or difunctional or polyfunctional urethane acrylates, difunctional or polyfunctional isocyanates or difunctional or polyfunctional epoxides. In this case, however, it is also possible to use any other difunctional or polyfunctional compounds which are familiar to the skilled person and are capable of crosslinking polyacrylates. Suitability as photo-initiators is possessed preferably by Norrish type I and type II cleaving compounds, some possible examples of both classes being benzophenone derivatives, acetophenone derivatives, benzile derivatives, benzoin derivatives, hydroxyalkylphenone derivatives, phenyl cyclohexyl ketone derivatives, anthraquinone derivatives, thioxanthone derivatives, triazine derivatives, or fluorenone derivatives, this recitation making no claim to completeness and instead being capable of expansion without an inventive step by the skilled person.

For advantageous development, no additives at all, such as tackifying resins or plasticizers, are added to the polyacrylate PSAs of the PSA tape. Although additives of this kind do increase the bond strength they may also reduce considerably the shear strength of the PSA and so lead to residues of adhesive on the slitting tools during the operation of slitting the biosensors.

Additives such as fillers (for example, fibers, carbon black, zinc oxide, titanium dioxide, chalk, solid or hollow glass spheres, microspheres of other materials, silica, silicates, nanoparticles), compounding agents and/or aging inhibitors, in the form for example of primary and secondary antioxidants or in the form of light stabilizers, can be added to the PSA.

In summary the preferred embodiment of the PSA tape comprises a polyacrylate PSA, the PSA tape being manufactured by coextrusion or coating from the melt, from solution or from dispersion. Particular preference is given to comma bar coating of the polyacrylate PSA from a suitable solvent or solvent mixture.

It is advantageous to use a primer layer between carrier film and polyacrylate PSA in order to improve the adhesion of the PSA to the carrier film and so to prevent residues of adhesive on the slitting tool during the operation of slitting the diagnostic test strips. Primers which can be used are the known dispersion and solvent systems, based for example on isoprene or butadiene rubber, cyclo rubber, polyvinyl chloride and/or polyvinyl dichloride. Isocyanate or epoxy resin additives enhance the adhesion and in some cases also increase the shear strength of the PSA. Physical surface treatments such as flaming, corona or plasma, or coextrusion layers, are likewise suitable for improving the adhesion.

Descriptions of the customary adhesives and also reverse-face coatings and primers are to be found for example in the "Handbook of Pressure Sensitive Adhesive Technology", D. Satas (3rd edition).

The inventive PSA tape can optionally contain a carrier film coated on both sides with the PSA. Carrier materials used are the customary carrier materials familiar to the skilled person, such as films of polyester, polyethylene, polypropylene, oriented polypropylene, or polyvinyl chloride, and with particular preference polyethylene terephthalate (PET) films. This recitation should not be understood as being conclusive; instead, further films are included in the scope of the invention.

For processing and use in the biosensor it can be of advantage if diecuts having a diecut shape suitable for the application are produced from the PSA tape. The diecut shape advantageously has at least one cutout which extends into the marginal region and which forms the measuring space of the biosensor in the PSA tape section.

The PSA tape diecuts are produced using the customary methods such as flat-bed diecutting, rotary diecutting, waterjet slitting or laser slitting. Production of the diecuts requires a very high degree of precision, in the µm range. The diecut produced from the PSA tape can be laminated immediately after the diecutting operation with the embossed film, so that the combination of the PSA-tape diecut and embossed film can be supplied directly to the production operation for the biosensors. It is likewise possible, however, for the PSA tape and the embossed film to be supplied to the production operation separately and to be laminated with one another only in that operation. The diecuts are preferably produced as continuous rolls, without being separated. In this case only the future measuring space is cut out. The separation of the individual diecuts is typically accomplished only by the slitting operation on the fully assembled biosensor.

According to one advantageous embodiment the structured film is a commercially customary polymer film made of, for example, polyester, polyethylene, polypropylene, oriented polypropylene, polyvinyl chloride, polyacrylate, polycarbonate and/or of corresponding laminates or coextrudates, and in a subsequent workstep is embossed using customary methods. The thickness of the structured film, which with further preference is planarly structured, is in particular 25 µm to 150 µm.

For the purpose of embossing, the structure is either melted into the film by means of a hot embossing die or is generated by a positive and negative heated embossing tool (counter-embossing). Embossing may take place discontinuously by embossing dies or continuously by embossing rolls. Structuring may likewise take place, for example, by microinjection-molding or thermoforming methods, by photolithographic methods or by the ablation of one or more layers of polymer by a laser (laser structuring). Since the structuring in question is microstructuring, with a structure depth of 20 to 150 µm and preferably of 20 to 80 µm, a very high precision is required, in the µm range. The structuring of the film serves to produce a channel for supplying air to the measuring space. Only by means of this air supply is it possible to fill the measuring space rapidly with the biological fluid, blood for example. Through the use of the structured film it is possible for the biological fluid to be transported rapidly to and in the measuring space of the biosensor. As a result of this it is possible to do without the measures provided for in the prior art for the exit of gas from the measuring space, such as, for example, the use of very complex diecut shapes or the diecutting or burning of a hole into the cover film of the biosensor. This produces a considerable processing advantage in the production of the biosensors. The structuring may additionally comprise an embossing of the measuring space. No restrictions at all are imposed on the shape and design of the measuring space. A structure depth of 20 to 150 μm and preferably of 20 to 80 μm is necessary in order to ensure the functional capacity of the biosensor with a very small volume of biological fluid. In the case of greater structure depths, a significantly greater quantity of biological fluid is needed in order to fill the measuring space. Going hand in hand with this is a prolongation of the measuring time. In the case of a relatively small structure depth, the transport of biological fluids whose viscosities are higher than that of water is slowed down markedly, leading likewise to a prolongation of the measuring time. Moreover, on account of the very small volume of fluid in such a case, the observation of incorrect measurements on the part of the biosensors is increased.

The structured film is advantageously furnished on one or both sides with a hydrophilic surface in order to achieve an additional improvement and acceleration of the transport of the biological fluid. In order to obtain a hydrophilic surface, the film itself, or the outer coextruded layer of the film, may be composed of a polar polymer, such as polyacrylate, PMMA, ethylene-vinyl acetate copolymer or PVC, for example, or the surface may be provided with a suitable coating. This coating may be composed, for example, of polar polymers such as polyvinylpyrrolidone, polyethylene glycol, PVC, polyvinylidene chloride, sodium carboxycellulose or of a surface-active surfactant such as alkylsulfonates or alkylbenzenesulfonates, sulfosuccinates or alkyl sulfates. Further examples of surface-active substances are found in "Ullmann's Encyclopedia of Industrial Chemistry" Vol. 25, 1994, VCH. The surface may also be made hydrophilic by methods such as etching with strong acids, such as trichloroacetic acid, or by plasma treatment.

Important factors concerning the biosensor of the invention include not only the biological compatibility of the constituents with the biological test fluid and with the enzyme reaction, but also the thickness tolerance and a low compressibility. Since, as a result of the thickness of the PSA tape, with the majority of biosensors the distance between the functional layers such as base film, woven fabric, and cover film, and hence the volume of the biological test fluid in the test strip, is determined, it is only by virtue of a low level of compressibility and also a very good thickness tolerance that correct measurement, for example, of the blood sugar content is possible.

The rapid transport of biological fluids such as blood, for example, in the combination of the invention is apparent in a speed for the biological fluid of at least 0.5 m/s, preferably at least 1.0 m/s, and with particular preference 1.5 m/s.

The characteristic quality of the biosensor of the invention results from the combination of the PSA tape and the structured film with a structure depth of 20 to 150 μm, the PSA used having a high level of cohesion and shear strength in conjunction with effective bond strength, with a thin adhesive layer of not more than 40 g/m². By virtue of this combination of qualities it is possible for the invention to achieve its object of a considerable reduction in the residues of adhesive on the slitting tool in the slitting operation in conjunction with a reduction in the complexity of the production operation for the biosensors and the ensuring of short measuring times. The reduction in the complexity of the production operation, and the short measuring times, are achieved by virtue of an appropriate structuring of the cover film.

The biosensor of the invention for analyzing biological fluids operates in accordance with a calorimetric or, preferably, an electrochemical measurement method. Preference is given in this context to the detection of glucose in human blood.

For the detection reaction the base layer is functionalized appropriately and forms the functional layer of the biosensor of the invention. The base film may be composed, for example, of PVC, paper, polycarbonate or polyester in a thickness range of preferably 300 to 500 μm. For an electrochemical biosensor for glucose determination, to start with, for this purpose conductor tracks for the working electrode, counterelectrode, and, where appropriate, for the reference electrode are printed onto the base material. This is done using conductive inks, composed for example of conductive carbon pastes, graphite pastes or silver pastes. Depending on construction, there may be insulating layers present between the various conductor-track layers, these insulating layers being applied likewise by printing. Alternatively the base film can also be laminated to a conductive layer of copper, silver, gold or aluminum, for example, or provided with such a layer by vapor deposition or sputtering. Here, in a subsequent operation, the conductor tracks are obtained by etching. Applied to the working electrode and counterelectrode is the enzyme or enzyme mixture needed for the detection reaction, comprising glucose oxidase/peroxidase, for example, and a redox mediator, ferrocene or derivatives for example.

Surprisingly and unforeseeably for the skilled worker, a laminate of the PSA tape with the structured film, having the properties according to the invention, is able on the one hand to solve the contradictory requirements for effective bond strength to the base material of the diagnostic test strips in conjunction with a low level of tackiness toward the slitting tools, and, on the other hand, rapid blood transport.

The figures described below are used to illustrate exemplary embodiments of the biosensor, without wishing thereby to impose any unnecessary restriction on the invention.

BRIEF DESCRIPTION OF THE DRAWINGS

Figure 1:
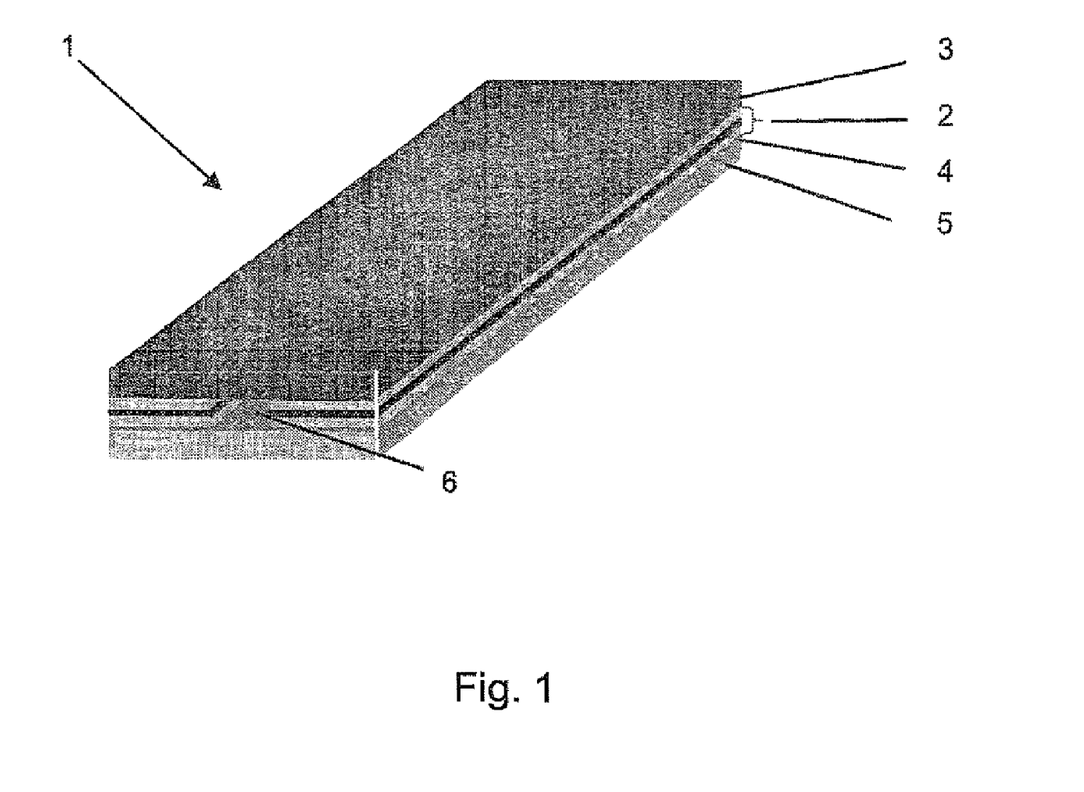
FIG. 1 shows one exemplary construction of a medical biosensor

FIG. 1 depicts an exemplary construction of a medical biosensor or diagnostic test strip schematically.

Test strip 1 is composed of a plurality of individual layers 2, 3, 4, and 5. Located on the section of base material 5, formed from 500 μm PET, are a plurality of functionally printed layers made up, for example, of conductive or insulating materials or enzymes. The base film and the functional printing form the functional layer 5 of the biosensor. These functional layers 5 are connected to a section of the structured film 3 having a preferably hydrophilically modified surface by means of a diecut of the double-sided PSA tape 2.

PSA tape 2 itself has two PSA layers formed preferably of a polyacrylate PSA, between which there is a PET carrier. The diecut of the PSA tape 2 forms a measuring space 6 which is formed from a section which extends into the marginal region and which is needed for the transport of the biological test fluid under measurement, blood for example, to the measuring cell.

Figure 2A:
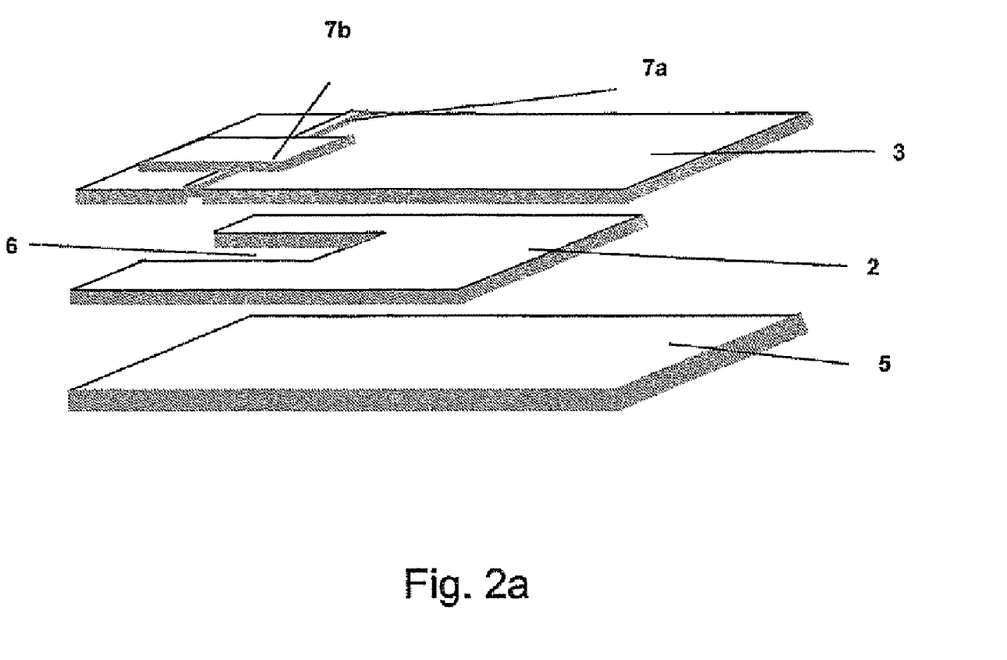
FIGS. 2a and 2b show one advantageous embodiment of the biosensor from FIG. 1, and FIGS. 3a and 3b show a further advantageous embodiment of the biosensor from FIG. 1.
Figure 2B:
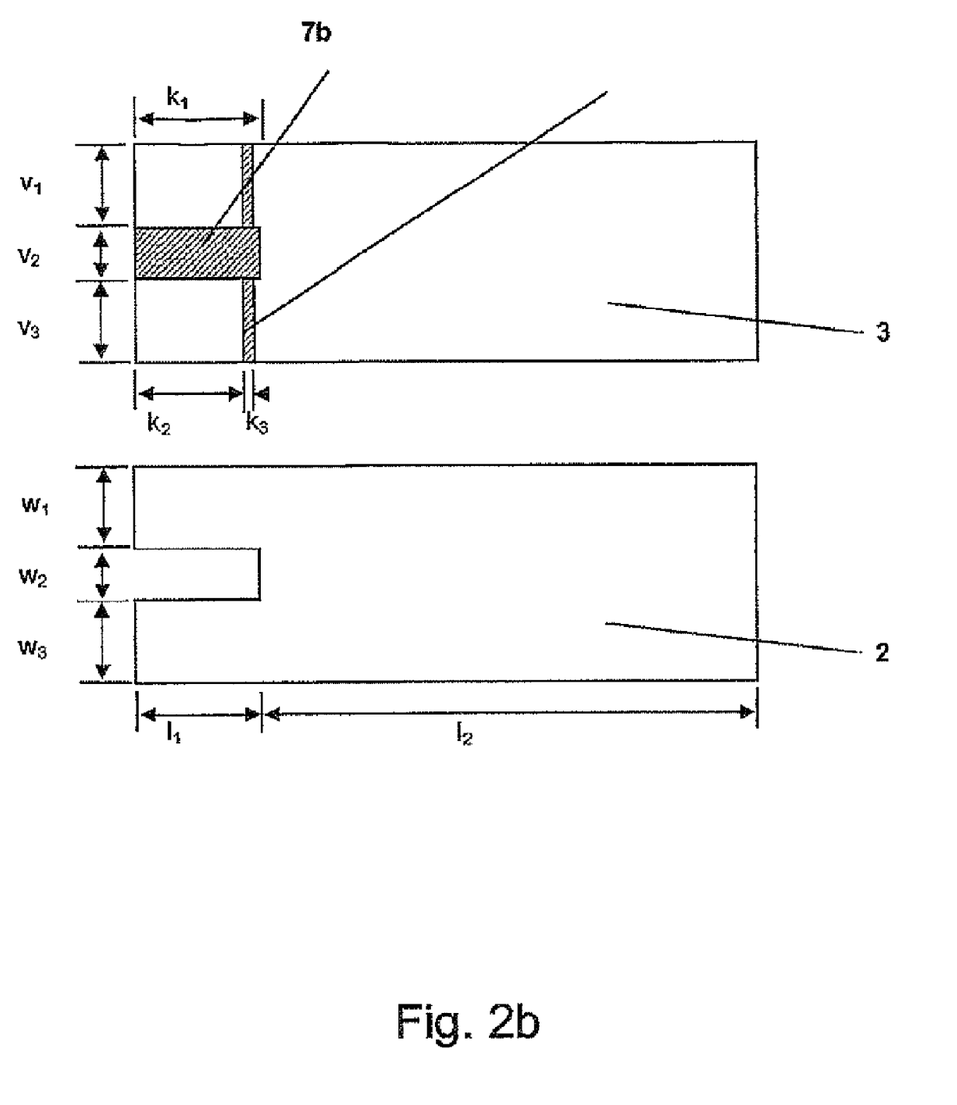

FIGS. 2a and 2b show one advantageous embodiment of the biosensor from FIG. 1. The test strip 1 is composed in accordance with FIG. 2a of three rectangular layers, specifically the functional layer 5, atop which there is the double-sidedly adhesive-furnished PSA tape 2, atop which there is the structured film 3, there being a measuring space 6 extending into the marginal region in the PSA tape layer 2. Said measuring space 6 is produced by punching out a rectangle from the layer of the PSA tape 2.

The structuring in the structured film 3 consists of a continuous channel 7a having a width of 40 μm and a depth of 40 μm. This channel serves for removing air from the measuring space 6 of the biosensor. The channel 7a intersects the measuring space 6 at a right angle.

Furthermore, there is an indentation 7b provided in the structured film above the measuring space 6, said indentation 7b having dimensions of 1 mm width, 5 mm length, and 40 μm depth.

FIG. 2b shows a plan view of the PSA-tape diecut 2 and of the section of the structured film 3, the structurings 7a, 7b of the structured film (indentations) being labeled. Also shown is the functional layer 5.

The layer of the structured film 3 has the following dimensions:

|  | Length [mm] |
|---|---|
| $v_1$ | 2 |
| $v_2$ | 1 |
| $v_3$ | 2 |
| $k_1$ | 5 |
| $k_2$ | 4.8 |
| $k_3$ | 0.04 |

The layer of the PSA tape 2 has the following dimensions:

|  | Length [mm] |
|---|---|
| $w_1$ | 2 |
| $w_2$ | 1 |
| $w_3$ | 2 |
| $l_1$ | 5 |
| $l_2$ | 15 |

Figure 3A:
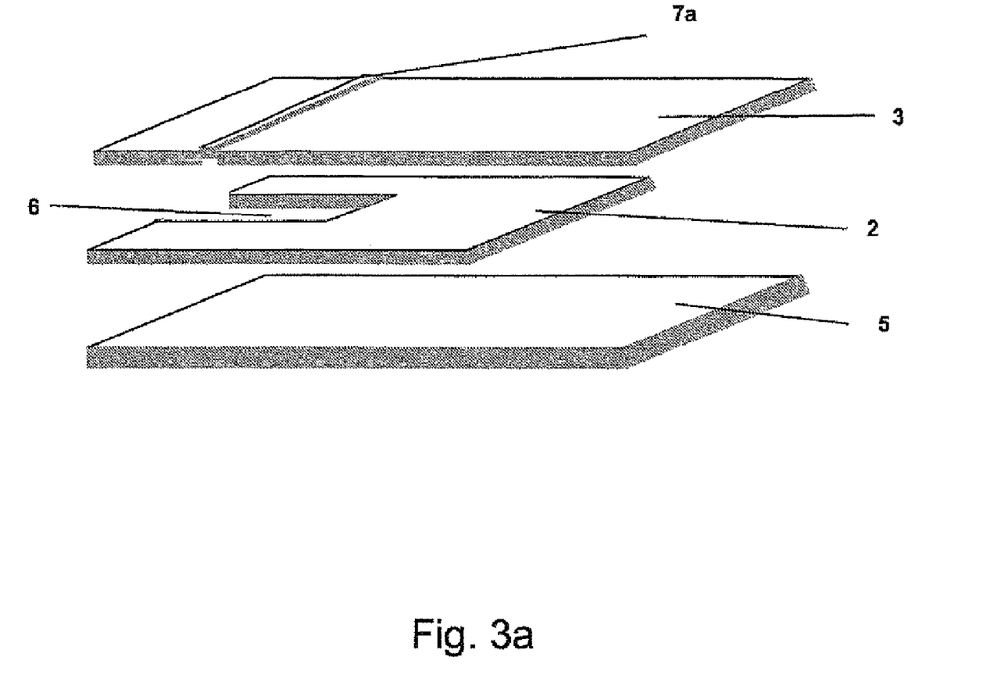
Figure 3B:
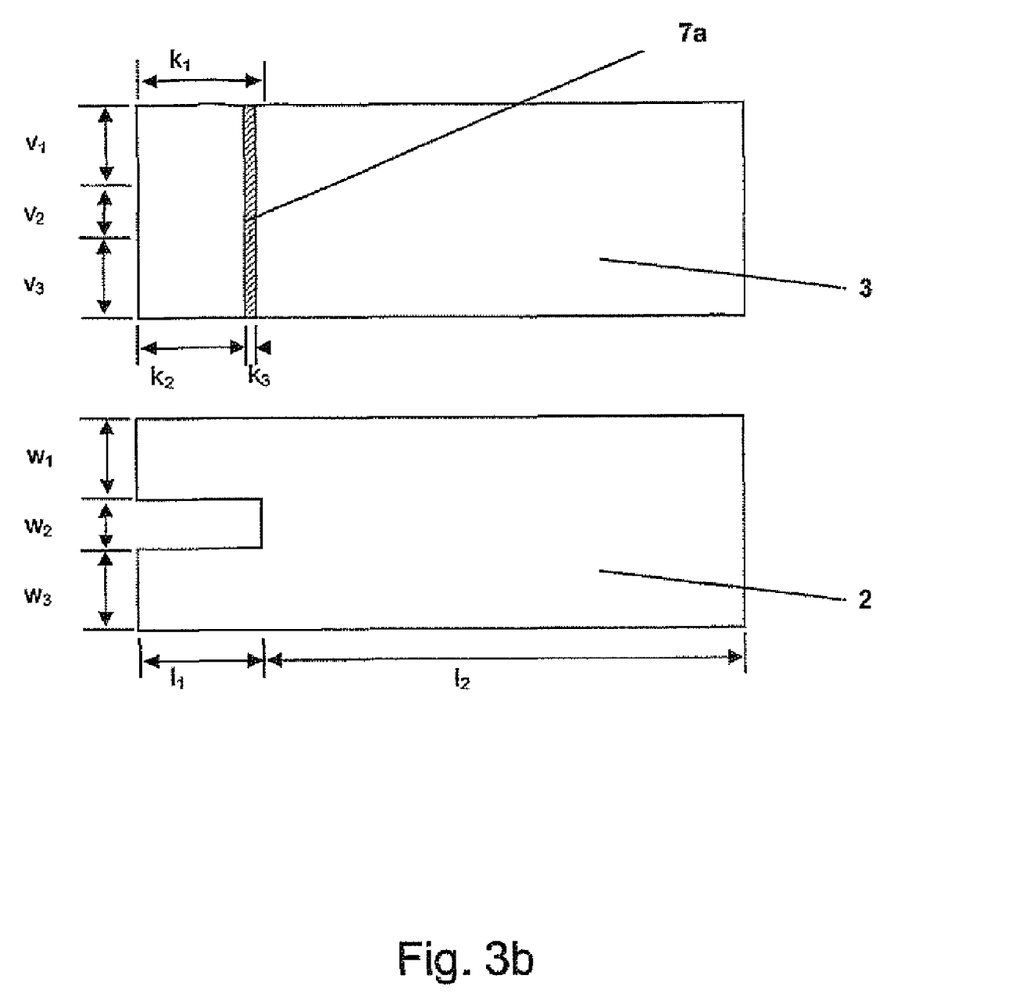

FIGS. 3a and 3b show one advantageous embodiment of the biosensor from FIG. 1.

The test strip 1 is composed in accordance with FIG. 3a of three rectangular layers, specifically the functional layer 5, atop which there is the double-sidedly adhesive-furnished PSA tape 2, atop which there is the structured film 3, there being a measuring space 6 extending into the marginal region in the PSA tape layer 2. Said measuring space 6 is produced by punching out a rectangle from the layer of the PSA tape 2.

The structuring in the structured film 3 consists of a continuous channel 7a having a width of 40 μm and a depth of 40 μm. This channel serves for removing air from the measuring space 6 of the biosensor. The channel 7a intersects the measuring space 6 at a right angle.

Test Methods

K Value

The K value is a measure of the average molecule size of high polymers. The principle of the method is based on a determination of the relative solution viscosity by capillary viscometry. For this purpose the test substance is dissolved in toluene by shaking for half an hour to give a 1% strength solution. The flow time is measured at 25° C. in a Vogel-Ossag viscometer and from this measurement the relative viscosity of the sample solution is determined in relation to the viscosity of the pure solvent. The K value (K=1000 k) can be read off from tables in accordance with Fikentscher [P. E. Hinkamp, *Polymer*, 1967, 8, 381].

Glass Transition

The dynamic glass transition of the PSA is determined by means of rheometrical investigation. A rheometer from the Ares range from the company TA is used. The glass transition temperature is the maximum of the tan $\delta(=G''/G')$ plot and is determined at 10 rad/s.

Gel Value

The solvent-free PSA samples are welded into a pouch of polyethylene nonwoven (Tyvek web). Soluble constituents are extracted with toluene over a period of three days, with the solvent changed daily. The gel value is determined from the difference between the sample weights before and after extraction, as a percentage of the weight fraction of the polymer which is not extractable with toluene.

Bond Strength

The peel strength (bond strength) was tested in a method based on PSTC-1. A strip of the PSA tape 2 cm wide is adhered to the test substrate, such as a ground steel plate or a PET plate; this is done by applying the tape and running a 5 kg roller over it back and forth five times. The plate is clamped in and the self-adhesive strip is pulled by its free end in a tensile testing machine under a peel angle of 180° at a speed of 300 mm/min; the force required in order to pull the strip is measured. The results are reported in N/cm and are averaged over three measurements. All measurements were conducted at room temperature.

Shear Withstand Times

The test was carried out along the lines of PSTC-7. A strip of the PSA tape 1.3 cm wide is adhered to a polished steel plaque over a length of 2 cm; this is done by applying the strip and using a 2 kg roller to roll over it back and forth twice. The plaques are equilibrated for 30 minutes under test conditions (temperature and humidity) but without loading. Then the test weight is hung on, producing a shearing stress parallel to the bond plane, and a measurement is made of the time taken for the bond to fail. If a holding time of 10 000 minutes is reached the experiment is discontinued before the adhesive bond fails.

Microshear Travel μS1

A strip of the PSA tape, 1 cm wide, is adhered to a polished steel plaque (test substrate) over a length of 5 cm; this is done by applying the strip and using a 2 kg roller to roll over it back and forth three times. Double-sided adhesive tapes are lined on the reverse with a 50 μm aluminum foil. The test strip is reinforced with a PET film 190 μm thick and then cut off flush using a fixing device. The edge of the reinforced test strip projects 1 mm beyond the edge of the steel plaque. The plaques are equilibrated for 15 minutes under test conditions (40° C., 50% relative humidity) in the measuring instrument but without loading. Then the 500 g test weight is hung on, producing a shearing stress parallel to the bond plane. A micro-travel recorder records the shear travel in graph form as a function of time.

The microshear travel µS1 reported is the shear path after a weight load over 15 minutes. After the 15-minute measurement period under weight load, the weight is carefully removed from the sample and then relaxation is observed for a further 15 minutes. After 15 minutes without a weight load (relaxation) the microshear travel µS2 is determined. The two measurements are used to give the microshear travel ratio µS2/µS1. This ratio is a measure of the elasticity of the PSA.

Capillary Test

The transport rate of biological fluids is measured in a capillary test. For this purpose an uncoated and untreated surface of a PET film 350 µm thick is laminated with the laminate under test, made up of the pressure-sensitive adhesive tape and the structured film, in such a way as to produce a capillary. To do this, two strips of the PSA tape are laminated in parallel onto the base film in such a way that a channel with a width of exactly 1 mm is formed between these two strips. This channel is subsequently covered with the structured film. The capillary is then held in animal blood. A determination is made of the time needed for the fluid front to cover 10 mm. Alternatively the laminate under test, comprising a diecut of the PSA tape and of the structured film, is laminated onto a PET film 350 µm thick. The rate of transport of the animal blood within the test element is determined in this case by means of video recording. The result reported for the capillary test is the rate of the blood front in mm/s.

The intention of the text below is to illustrate the invention by means of a number of examples, without wishing thereby to restrict the invention unnecessarily.

EXAMPLES

Example 1

A reactor conventional for a radical polymerization was charged with 8 kg of acrylic acid, 45 kg of n-butyl acrylate, 3 kg of t-butyl acrylate and 60 kg of acetone. After nitrogen gas had been passed through the reactor for 45 minutes with stirring the reactor was heated to 58° C. and 20 g of azoisobutyronitrile (AIBN, Vazo 6®, DuPont) were added. Subsequently the external heating bath was heated to 75° C. and the reaction was carried out constantly at this external temperature. After a reaction time of 1 h a further 20 g of AIBN were added. After 3 h and 6 h the mixture was diluted with 10 kg of acetone/isopropanol (97:3) each time. In order to reduce the residual initiators after 8 h and after 10 h portions of 100 g of bis(4-tert-butylcyclohexanyl) peroxydicarbonate (Perkadox 16®, Akzo Nobel) were added. The reaction was terminated after a reaction time of 22 h and the reaction mixture was cooled to room temperature.

After the polymerization the polymer was diluted with isopropanol to a solids content of 25% and then blended with 0.3% by weight of polyisocyanate (Desmodur N 75, Bayer) with stirring. Subsequently the polymer solution was coated using a comma bar onto both sides of a polyester carrier with a thickness of 50 µm which beforehand had been coated with 1 g/m² per side of polyvinyl dichloride-acrylonitrile copolymer (Saran, Dow Chemicals). Drying took place at 120° C. for 10 minutes. The coatweight per side was 12 g/m². After the first coating step the adhesive was lined with a release paper.

A rotary punch is used to produce diecuts from the PSA tape, with a diecut rectangle whose dimensions are 1 mm×5 mm. A continuous channel (air removal channel) is made in a rigid PVC film by means of hot embossing, this channel being 40 µm wide and 40 µm deep parallel to the machine direction. The diecut is subsequently laminated with the rigid PVC film in such a way that the continuous channel intersects the free rectangle removed by diecutting (see FIG. 3a).

This laminate of the PSA diecut and the structured film is laminated to the functional layer in order to form the biosensor.

The functional layer is constructed as follows. The conductive tracks are printed onto a 350 µm PET film, using a silver-based conductive ink. In the region of the measuring space the reactive layer is subsequently applied, which is composed of glucose dehydrogenase as the active component, coenzyme NAD+, 1,10-phenanthroline as mediator, and a binder of hydroxyethyl cellulose, this reactive layer being applied to the working electrode.

Example 2

A reactor conventional for a radical polymerization was charged with 28 kg of acrylic acid, 292 kg of 2-ethylhexyl acrylate, 40 kg of methyl acrylate and 300 kg of acetone/isopropanol (97:3). After nitrogen gas had been passed through the reactor for 45 minutes with stirring the reactor was heated to 58° C. and 0.2 kg of azoisobutyronitrile (AIBN, Vazo 64®, DuPont) was added. Subsequently the external heating bath was heated to 75° C. and the reaction was carried out constantly at this external temperature. After a reaction time of 1 h a further 0.2 kg of AIBN was added. After 3 h and 6 h the mixture was diluted with 150 kg of acetone/isopropanol (97:3) each time. In order to reduce the residual initiators after 8 h and after 10 h portions of 0.4 kg of bis(4-tert-butylcyclohexanyl) peroxydicarbonate (Perkadox 16®, Akzo Nobel) were added. The reaction was terminated after a reaction time of 22 h and the reaction mixture was cooled to room temperature.

After the polymerization the polymer was diluted with isopropanol to a solids content of 25% and then blended with 0.4% by weight of aluminum(III) acetylacetonate with stirring. Subsequently the polymer solution was coated using a comma bar onto both sides of a polyester carrier with a thickness of 12 µm which beforehand had been corona-pretreated. Drying took place at 120° C. for 10 minutes. The coatweight per side was 12 g/m². After the first coating step the adhesive was lined with a release paper.

In accordance with Example 1, diecuts are produced from the PSA tape. The diecut is subsequently laminated to a structured PET film so that the free rectangle in the diecut, removed by diecutting, coincides exactly with the structuring of the film. The shape of the structuring is apparent from FIG. 2a, with the air removal channel having—in analogy to Example 1—the dimensions 40 µm wide and 40 µm deep, and the indentation for the measuring space having the dimensions 1 mm wide, 5 mm long and 40 µm deep. The base material used for the structured film is the hydrophilic PET film 3M® 9971.

This laminate of the PSA tape diecut and the structured film is laminated to the functional layer, as described in Example 1, to give the biosensor.

Example 3

A pressure-sensitive adhesive as in Example 2 is coated with a layer thickness of 13 µm onto release paper. From the transfer tape, diecuts are produced as in Example 2. As in Example 2, the structured film is composed of an embossing for the air removal channel and an embossing for the measuring space. The structure depth for the measuring space here, however, is 70 μm. The base material used for the structured film is a 100 μm PET film hydrophilicized on one side at 0.2 g/m² with Disponil® AP 600 (alkylpolyglycoside from Cognis).

This laminate of the PSA tape diecut and the structured film is laminated to the functional layer, as described in Example 1, to form the biosensor.

|  | Example 1 | Example 2 | Example 3 |
|---|---|---|---|
| PSA | All-acrylate | All-acrylate | All-acrylate |
| PSA coatweight per side [g/m²] | 12 | 12 | 12 |
| Total thickness of PSA tape without release film [μm] | 73 | 36 | 13 |
| K value 25° C. of the PSA [Pa * s] | 74 | 62 | 62 |
| Glass transition temperature of the PSA [° C.] | 0 | −5 | −5 |
| Microshear travel 500 g, 40° C. [μm] | 23 | 49 | 53 |
| Ratio μS2/μS1 | 0.15 | 0.18 | 0.19 |
| Shear strength at 70° C. [min] | >10 000 | >10 000 | >10 000 |
| Bond strength to steel [N/cm] | 2.5 | 3.2 | 2.9 |
| Bond strength to PET [N/cm] | 1.1 | 1.9 | 1.7 |
| Capillary test [mm/s] | 2 | 4 | 3 |
| Slitting tests (8000 slits) | Minimal adhesive residues after 8000 slits | Slight adhesive residues after 8000 slits | Slight adhesive residues after 8000 slits |

COUNTEREXAMPLES

Counterexample 1

As Counterexample 1 the commercial product Tesa® 4980 is used to produce a diecut as in Example 1, and said diecut is laminated to a structured film as in Example 1. This adhesive tape is a double-sided PSA tape composed of a 12 μm PET carrier material coated on both sides with 34 g/m² of a resin-modified acrylate PSA. The laminate formed from the PSA tape diecut and the structured film is laminated to the functional layer, as described in Example 1, to form the biosensor.

After the slit biosensors have been stored for a time of a few days, it is observed that the embossed air removal channels have become partly or completely clogged with adhesive primarily at the slit edges.

Counterexample 2

The PSA tape and diecut are produced as described in Example 1. The carrier film employed is a 12 μm PET film. The coatweight is 50 g/m² per side. The structured film used is that described in Example 1. The laminate of the PSA tape diecut and the structured film is laminated to the functional layer, as described in Example 1, to form the biosensor.

Here again, as a result of the high coatweight, partial clogging of the air supply channels is observed.

Counterexample 3

As Counterexample 3 the commercial product Scotch® 415 from 3M is used. This adhesive tape is a double-sided PSA tape composed of a 50 μm PET carrier material coated on both sides with 25 g/m² of an all-acrylate PSA.

The laminate of the PSA tape diecut and the structured film is laminated to the functional layer, as described in Example 1, to form the biosensor.

The cover film used (not structured) is the hydrophilicized film 9971 from 3M.

|  | Counter-example 1 | Counter-example 2 | Counter-example 3 |
|---|---|---|---|
| PSA | Acrylate, resin-modified | All-acrylate | All-acrylate |
| PSA coatweight per side [g/m²] | 34 | 50 | 25 |
| Total thickness of PSA tape without release film [μm] | 80 | 112 | 100 |
| K value 25° C. of the PSA [Pa * s] | 57 | 62 | Unknown |
| Glass transition temperature of the PSA [° C.] | 5 | 0 | −4 |
| Microshear travel μS1 500 g, 40° C. [μm] | 470 | 45 | 550 |
| Ratio μS2/μS1 | 0.31 | 0.16 | 0.35 |
| Shear strength at 70° C. [min] | 1278 | >10 000 | 1269 |
| Bond strength to steel [N/cm] | 8.3 | 3.7 | 2.7 |
| Bond strength to PET [N/cm] | 6.5 | 2.8 | 2.2 |
| Capillary test [mm/s] | Severe scatter in values <0.4 | Severe scatter in values <0.9 | 4 |
| Slitting tests (8000 slits) | Severe adhesive residues; termination after 2000 slits | Adhesive residues; termination after 4500 slits | Severe adhesive residues; termination after 2000 slits |

The invention claimed is:

1. A medical biosensor by means of which biological fluids are analyzed, comprising at least three layers: a functional layer comprising conductor tracks or being laminated to a conductive layer, and also comprising an enzyme or enzyme mixture, atop which there is a double-sidedly adhesive PSA tape comprising a measuring space, atop which there is a layer of structured film, said structured film having a continuous open channel embossed into the surface of the side facing said measuring space and running from said measuring space to an edge of the structured film, the shear strength of the adhesive on the pressure-sensitive adhesive tape at 25° C. and 70° C. under a weight load of 1000 g being greater than 10 000 min,
    and the polymer or polymers of the adhesive having a K value of greater than 55 Pa*s, and
    the structure depth of the structured film being 20 to 150 μm.

2. The medical biosensor of claim 1, wherein the adhesive is composed of one or more copolymers in which acrylate monomers form the principal constituent.

3. The medical biosensor of claim 1, wherein the polymers of the pressure-sensitive adhesive have a K value of greater than 60 Pa*s.

4. The medical biosensor of claim 1, wherein the microshear travel of the pressure-sensitive adhesive tape after 15 minutes at 40° C. under a load of 500 g is less than 100 µm.

5. The medical biosensor of claim 1, wherein the ratio of the microshear travels, µS2/µS1, is less than 0.3.

6. The medical biosensor of claim 1, wherein the sum of the adhesive coatweight on the top and bottom sides of the pressure-sensitive adhesive tape is not more than 40 g/m².

7. The medical biosensor of claim 1, wherein the pressure-sensitive adhesive tape is composed of a carrier foil, which is coated on both sides with not more than 20 g/m² of a pressure-sensitive adhesive.

8. The medical biosensor of claim 1, wherein
the dynamic glass transition temperature of the adhesive at 10 rad/s is −10° C. to 15° C.,
the adhesive contains no additions at all of tackifier resins or plasticizers, the bond strength of the adhesive to steel is at least 1.5 and/or
the bond strength of the adhesive to PET is at least 1.0 N/cm.

9. The medical biosensor of claim 1, wherein the structured film is selected from the group consisting of polyester, polyethylene, polypropylene, oriented polypropylene, polyvinyl chloride, polyacrylate, and polycarbonate and laminates or coextrudates thereof.

10. The medical biosensor of claim 1, wherein the thickness of the structured film is 25 µm to 150 µm.

11. The medical biosensor of claim 1, wherein the film is planarly structured.

12. The medical biosensor of claim 1, wherein a said continuous channel has a width of 20 to 60 µm and a depth of 20 to 60 µm.

13. The medical biosensor of claim 1, wherein the structured film is hydrophilically modified on one or both sides.

14. The medical biosensor of claim 7, wherein said carrier foil is polyester.

15. The medical biosensor of claim 1, wherein said channel extends perpendicularly to the measuring space.

* * * * *